United States Patent
Kashiwagi et al.

(10) Patent No.: US 10,935,957 B2
(45) Date of Patent: Mar. 2, 2021

(54) PROCESSING APPARATUS (71) Applicant: DISCO CORPORATION, Tokyo (JP)

(72) Inventors: Keiji Kashiwagi, Tokyo (JP); Satoshi Miyata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 25 days.

(21) Appl. No.: 16/376,347

(22) Filed: Apr. 5, 2019

(65) Prior Publication Data

US 2019/0317471 A1    Oct. 17, 2019

(30) Foreign Application Priority Data

Apr. 13, 2018 (JP) .............................. JP2018-077357

(51) Int. Cl.
*G05B 19/402* (2006.01)

(52) U.S. Cl.
CPC .. *G05B 19/402* (2013.01); *G05B 2219/36185* (2013.01); *G05B 2219/50122* (2013.01)

(58) Field of Classification Search
None
See application file for complete search history.

(56) References Cited

U.S. PATENT DOCUMENTS

| 2001/0044256 A1* | 11/2001 | Sekiya | B28D 5/0094 451/5 |
| 2013/0218322 A1* | 8/2013 | Carli | B23Q 1/0045 700/180 |
| 2016/0346956 A1* | 12/2016 | Takekawa | B23Q 17/20 |

FOREIGN PATENT DOCUMENTS

JP    2012146831 A    8/2012

* cited by examiner

*Primary Examiner* — Kenneth M Lo
*Assistant Examiner* — Istiaque Ahmed
(74) *Attorney, Agent, or Firm* — Greer, Burns & Crain, Ltd.

(57) ABSTRACT

A cutting apparatus includes a chuck table that holds a workpiece, a processing unit that forms a processed groove in the workpiece, an imaging unit that images the workpiece, a display unit that displays a captured image of a processed groove imaged by the imaging unit, and a control unit that executes display control of a display screen of the display unit. The control unit causes a mark that indicates the latest processed groove based on the Y-coordinate of the latest processed groove to be displayed on the display unit while being superimposed on a captured image.

20 Claims, 6 Drawing Sheets

PROCESSING APPARATUS

BACKGROUND OF THE INVENTION

Field of the Invention

The present invention relates to a processing apparatus that processes a workpiece.

Description of the Related Art

A processing apparatus is equipped with an imaging unit for alignment. By positioning a reference line of a microscope of the imaging unit onto a planned processing line called a street on a workpiece, the workpiece is processed along the street. In this case, in control means of the processing apparatus, a target pattern on the workpiece, the distance from the target pattern to the center of the street, the distance between the streets (index value), and so forth are registered in advance. Then, the reference line of the microscope is positioned onto the center of the street by finding the target pattern on the workpiece by the microscope.

Furthermore, in processing, work of adjusting the reference line of the microscope of the imaging unit to the center line of processing means, so-called hairline adjustment, is executed (for example, refer to Japanese Patent Laid-open No. 2012-146831). In the hairline adjustment, a processed groove is formed on a surface of the workpiece and is imaged, and the deviation of the reference line of the microscope from the central position of the processed groove is calculated. Furthermore, because the deviation between the central position of the processed groove and the reference line of the microscope appears as the deviation between the processing means and the microscope, the position at which the central position of the processed groove is made to match the reference line of the microscope is stored in the control means as the position of the origin through use of this deviation as a correction amount.

SUMMARY OF THE INVENTION

Incidentally, when the processing of the workpiece is continued, a deviation begins to occur in the positional relationship between the central position of the processing means and the reference line of the microscope. Therefore, the processing is temporarily suspended, and hairline adjustment is executed in some cases. In the case of manually executing the hairline adjustment, the position of the reference line of the microscope needs to be adjusted to the central position of the latest processed groove at the time of suspension of the processing. If a quality check or the like of plural processed grooves is executed and the sight of the latest processed groove is lost before the execution of the hairline adjustment, possibly the hairline adjustment and so forth are executed with another processed groove accidentally.

Thus, an object of the present invention is to provide a processing apparatus with which always the latest processed groove can be recognized without losing the sight of the latest processed groove.

In accordance with an aspect of the present invention, there is provided a processing apparatus including: a chuck table that holds a workpiece; a processing unit that forms a processed groove in the workpiece held by the chuck table; a processing feed mechanism that relatively moves the chuck table and the processing unit in a processing feed direction that is an X-axis direction; an indexing feed mechanism that relatively moves the chuck table and the processing unit in an indexing feed direction that is a Y-axis direction perpendicular to the processing feed direction; an imaging unit that images the workpiece held by the chuck table; a display unit that displays a captured image of a processed groove obtained by imaging, by the imaging unit, the processed groove formed through processing the workpiece by the processing unit; and a control unit. The control unit includes a latest processed groove Y-coordinate storing part that stores a Y-coordinate of a latest processed groove and a display control part that causes a mark that indicates the latest processed groove based on the Y-coordinate to be displayed in a superimposed manner on the captured image displayed on the display unit.

According to this configuration, the mark that indicates the latest processed groove is displayed on the captured image in a superimposed manner by the display unit. Because the latest processed groove is indicated by the mark on the captured image, it is possible to cause the operator to always recognize the position of the latest processed groove. Furthermore, the sight of the latest processed groove is not lost even when the imaging unit is moved and a place different from the latest processed groove is checked.

In the aspect of the present invention, the display control part may switch a direction indicated by the mark according to a present imaging position of the imaging unit and the Y-coordinate of the latest processed groove.

According to the present invention, by displaying the mark that indicates the latest processed groove on the captured image in a superimposing manner, the operator can be caused to always recognize the position of the latest processed groove without losing the sight of the latest processed groove.

The above and other objects, features and advantages of the present invention, and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
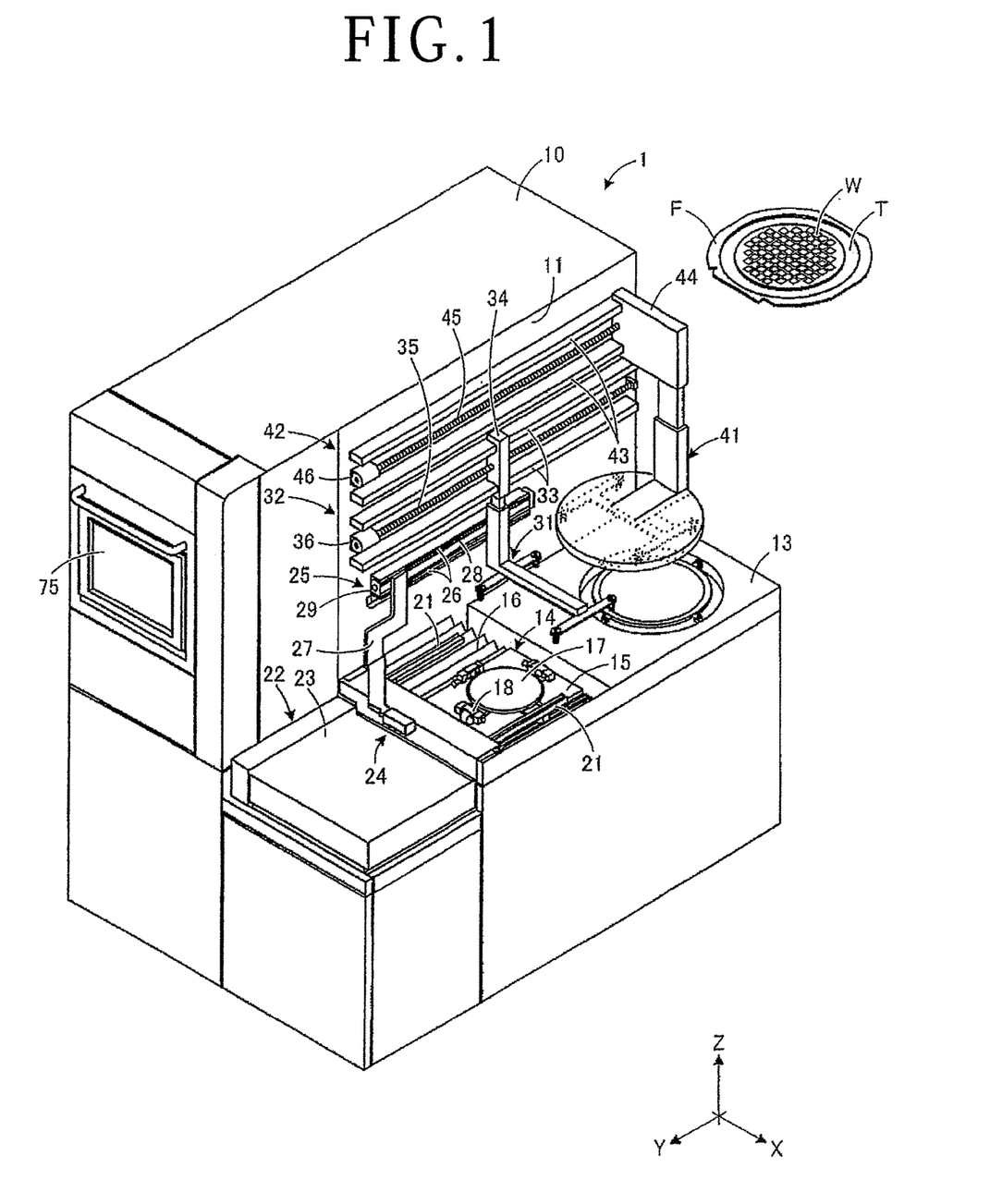
FIG. 1 is an appearance perspective view of a cutting apparatus of the present embodiment.
Figure 2:
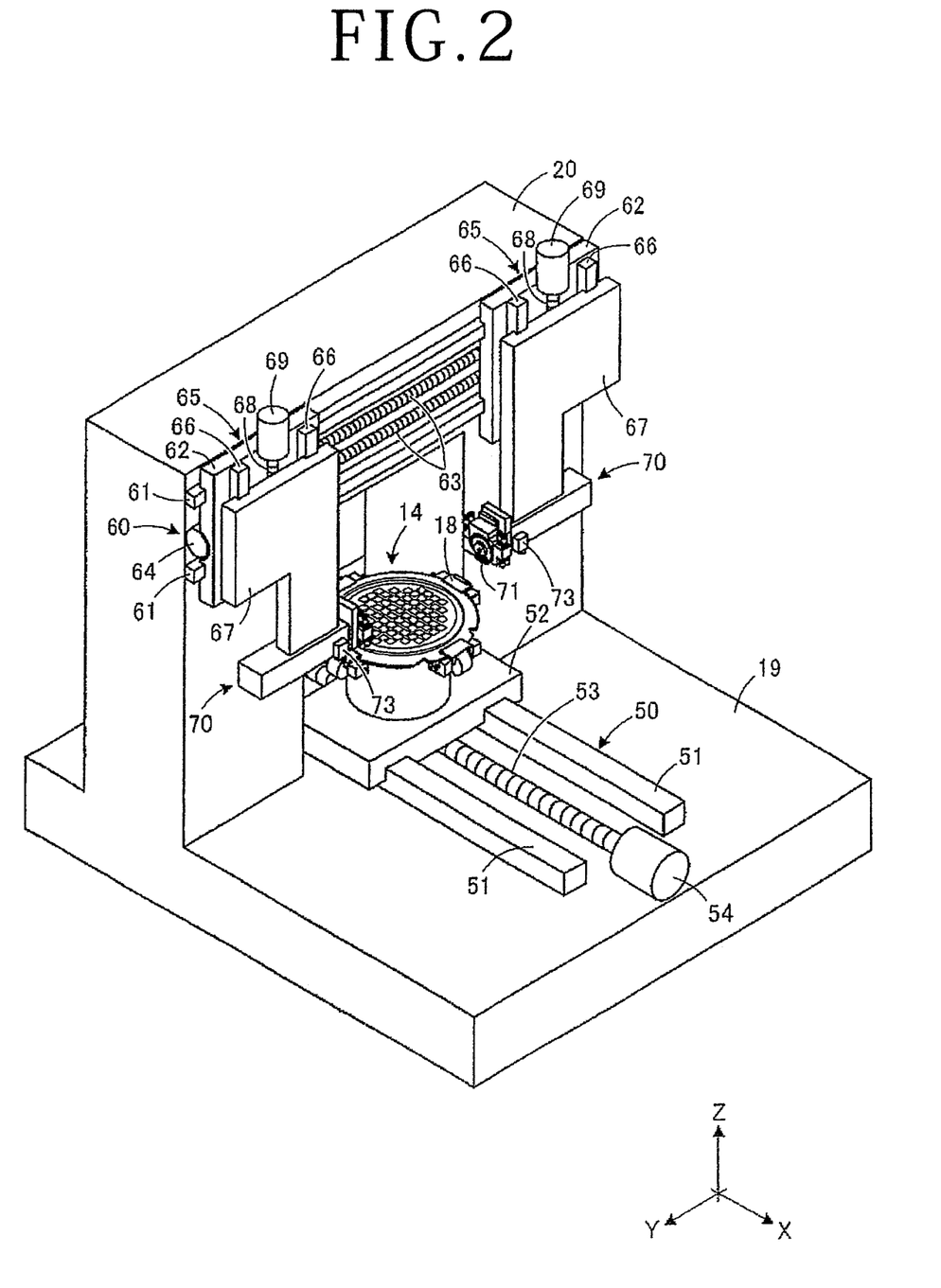
FIG. 2 is a perspective view of the inside of the cutting apparatus of the present embodiment.
Figure 3A:
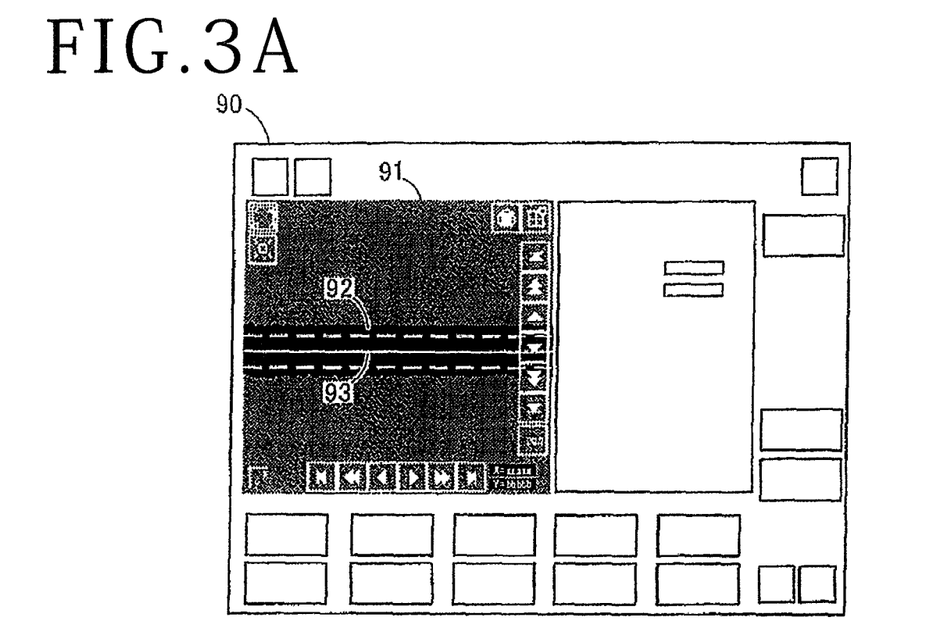
FIG. 3A and FIG. 3B are diagrams depicting one example of a stop screen of a comparative example.
Figure 3B:
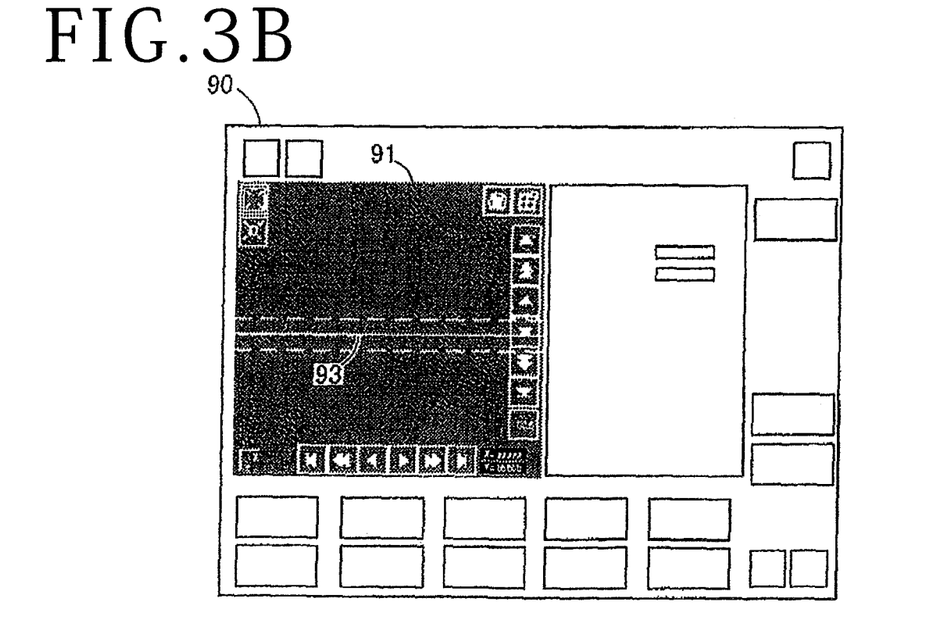

A cutting apparatus of the present embodiment will be described below with reference to the accompanying drawings. FIG. 1 is an appearance perspective view of the cutting apparatus of the present embodiment. FIG. 2 is a perspective view of the inside of the cutting apparatus of the present embodiment. FIG. 3A and FIG. 3B are diagrams depicting one example of a stop screen of a comparative example. Although the description will be made through exemplification of the cutting apparatus as a processing apparatus in the present embodiment, the processing apparatus is not particularly limited as long as it is what forms a processed groove.

As depicted in FIG. 1, a cutting apparatus 1 is equipped with a display unit (display means) 75 that accepts operation from an operator and various processing conditions are set in the cutting apparatus 1 by the display unit 75. The cutting apparatus 1 is configured to relatively move cutting blades 71 (see FIG. 2) and a workpiece W held by a chuck table 14 and process the workpiece W on the chuck table 14 along streets based on the setting conditions set by the display unit 75. A surface of the workpiece W is segmented into plural regions by the streets in a lattice manner and various devices are formed in each of the regions obtained by the segmenting.

A dicing tape T is stuck to the workpiece W and a ring frame F is stuck to the periphery of the dicing tape T. The workpiece W is carried in to the cutting apparatus 1 in the state of being supported by the ring frame F with the intermediary of the dicing tape T. It suffices for the workpiece W to be what becomes a processing target. For example, the workpiece W may be a semiconductor wafer or optical device wafer on which devices have been formed. Furthermore, the dicing tape T may be a die attach film (DAF) tape obtained by sticking a DAF to a tape base besides a normal adhesive tape obtained by applying an adhesive layer on a tape base.

The cutting apparatus 1 has a casing 10 that covers the processing space of cutting processing and has a rectangular parallelepiped shape and a support base 13 that is adjacent to the casing 10 and forms a waiting space and a cleaning space. The center of the upper surface of the support base 13 is opened to extend toward the inside of the casing 10 and this opening is covered by a moving plate 15 that can move together with the chuck table 14 and a waterproof cover 16 having an accordion shape. A processing feed mechanism (processing feed unit) 50 (see FIG. 2) that moves the chuck table 14 in a processing feed direction that is an X-axis direction is disposed under the waterproof cover 16. In FIG. 1, the state in which the chuck table 14 has been moved to the outside of the casing 10 and been made to wait over the support base 13 is depicted.

A holding surface 17 is formed in the chuck table 14 by a porous ceramic material and the workpiece W is sucked and held by a negative pressure generated through this holding surface 17. Four clamps 18 of an air-driven type are disposed around the chuck table 14 and the ring frame F around the workpiece W is clamped and fixed from four sides by the respective clamps 18. A pair of centering guides 21 that extend along a Y-axis direction are disposed over the chuck table 14. Through separation and approximation of the pair of centering guides 21 in the X-axis direction, the workpiece W is positioned in the X-axis direction relative to the chuck table 14.

On the support base 13, an elevator unit 22 on which a cassette is placed is disposed adjacent to the chuck table 14. In the elevator unit 22, a stage 23 on which a cassette is placed is lifted and lowered and the loading/unloading position of the workpiece W in the cassette is adjusted in the height direction. A side surface 11 of the casing 10 is equipped with a push-pull arm 24 that loads and unloads the workpiece W into and from a cassette while causing the pair of centering guides 21 to guide the ring frame F. Furthermore, the side surface 11 of the casing 10 is equipped with a carry-in arm 31 and a carry-out arm 41 that convey the workpiece W between the pair of centering guides 21 and the chuck table 14.

The push-pull arm 24 is driven by a horizontal movement mechanism 25 disposed on the side surface 11 of the casing 10. The horizontal movement mechanism 25 has a pair of guide rails 26 that are disposed on the side surface 11 of the casing 10 and are parallel to the Y-axis direction and a slider 27 that is slidably set on the pair of guide rails 26 and is motor-driven. A nut part (not depicted) is formed on the back surface side of the slider 27 and a ball screw 28 is screwed to this nut part. A drive motor 29 joined to a one-end part of the ball screw 28 is rotationally driven and thereby the push-pull arm 24 executes push-pull action in the Y-axis direction along the pair of guide rails 26.

The carry-in arm 31 and the carry-out arm 41 are driven by horizontal movement mechanisms 32 and 42 disposed on the side surface 11 of the casing 10. The horizontal movement mechanisms 32 and 42 have pairs of guide rails 33 and 43 that are disposed on the side surface 11 of the casing 10 and are parallel to the Y-axis direction and sliders 34 and 44 that are slidably set on the pairs of guide rails 33 and 43 and are motor-driven. Nut parts (not depicted) are formed on the back surface side of the sliders 34 and 44 and ball screws 35 and 45 are screwed to these nut parts. Drive motors 36 and 46 joined to one-end parts of the ball screws 35 and 45 are rotationally driven and thereby the carry-in arm 31 and the carry-out arm 41 are conveyed and moved in the Y-axis direction along the pairs of guide rails 33 and 43.

As depicted in FIG. 2, the processing feed mechanism 50 that moves the chuck table 14 in the processing feed direction that is the X-axis direction is disposed on a base 19 in the casing 10 and the support base 13 (see FIG. 1). The processing feed mechanism 50 has a pair of guide rails 51 that are disposed on the base 19 and are parallel to the X-axis direction and an X-axis table 52 that is slidably set on the pair of guide rails 51 and is motor-driven. A nut part (not depicted) is formed on the back surface side of the X-axis table 52 and a ball screw 53 is screwed to this nut part. A drive motor 54 joined to a one-end part of the ball screw 53 is rotationally driven and thereby the chuck table 14 is moved in the processing feed direction along the pair of guide rails 51.

A gate-shaped upright wall part 20 disposed uptight in such a manner as to straddle the movement path of the chuck table 14 is disposed on the base 19. The upright wall part 20 is equipped with an indexing feed mechanism (indexing feed unit) 60 that moves processing units (processing means) 70 in an indexing feed direction that is the Y-axis direction perpendicular to the processing feed direction and cutting-in feed mechanisms (cutting-in feed units) 65 that move the processing units 70 in a cutting-in feed direction that is a Z-axis direction. The indexing feed mechanism 60 has a pair of guide rails 61 that are disposed on the front surface of the upright wall part 20 and are parallel to the Y-axis direction and Y-axis tables 62 slidably set on the pair of guide rails 61. The cutting-in feed mechanisms 65 each have a pair of guide rails 66 that are disposed on the Y-axis table 62 and are parallel to the Z-axis direction and a Z-axis table 67 slidably set on the pair of guide rails 66.

The processing units 70 that cut the workpiece W are disposed under the respective Z-axis tables 67. A nut part is formed on the back surface side of each of the Y-axis tables 62 and the Z-axis tables 67 and ball screws 63 and 68 are screwed to these nut parts. Drive motors 64 and 69 are joined to one-end parts of the ball screws 63 for the Y-axis tables 62 and the ball screws 68 for the Z-axis tables 67, respectively. The respective ball screws 63 and 68 are rotationally driven by the drive motors 64 and 69. Thereby, each piece of processing units 70 is moved in the indexing feed direction along the guide rails 61 and each piece of processing units 70 is moved in the cutting-in feed direction along the guide rails 66.

The cutting blade 71 that processes the workpiece W held by the chuck table 14 is rotatably mounted to a spindle of each piece of processing units 70. Each cutting blade 71 is shaped into a circular disc shape by binding diamond abrasive grains by a binding agent, for example. An imaging unit (imaging means) 73 that images the workpiece W held by the chuck table 14 is disposed on a spindle case of the processing units 70. The workpiece W imaged by the imaging unit 73 is displayed on the display unit 75 (see FIG. 1) and various kinds of work such as teaching at the time of alignment and hairline adjustment are executed on the display screen. Furthermore, the cutting apparatus 1 is equipped with a control unit (control means) 80 (see FIG. 4) that carries out overall control of the respective parts of the apparatus.

Incidentally, as depicted in the comparative example of FIG. 3A, manual hairline adjustment is executed through adjusting a reference line 93 of the imaging unit 73 (see FIG. 2) to the central position of a processed groove 92 in the width direction on a stop screen 90. The positional relationship between the center line of the cutting blade 71 (see FIG. 2) and the reference line 93 of the imaging unit 73 is corrected by the hairline adjustment. The hairline adjustment is executed every time the cutting blade 71 is replaced. Besides, the hairline adjustment is executed after the processing is suspended in order to correct a deviation caused in the processing regarding the positional relationship between the cutting blade 71 and the imaging unit 73. In order to correct the deviation caused in the processing, the reference line 93 of the imaging unit 73 needs to be adjusted to the central position of the latest processed groove 92 at the time of suspension of the processing.

However, as depicted in the comparative example of FIG. 3B, when the imaging unit 73 is moved in order to check the processing quality of another processed groove 92 at the time of suspension of the processing, the latest processed groove 92 gets out of the stop screen 90 and the sight of this processed groove 92 is lost in some cases. Even if returning the stop screen 90 to the original position is attempted, it is difficult to return it to the accurate position through manual operation and it is difficult to determine whether or not the processed groove 92 in the stop screen 90 is the latest processed groove 92. Furthermore, in the cutting apparatus 1 of the present embodiment, the processed grooves 92 are concurrently formed by the cutting blades 71 on the first spindle side and the second spindle side. Therefore, even when the latest processed groove 92 is displayed on the stop screen 90, it is impossible to immediately determine which of the cutting blades 71 on the first spindle side and the second spindle side processed this processed groove 92.

Thus, in the present embodiment, a mark 85a or 85b (see FIG. 4) that indicates the latest processed groove 92 is displayed in a superimposed manner on a captured image 91 obtained by imaging by the imaging unit 73 and the operator is caused to recognize the position of the latest processed groove 92. Furthermore, the marks 85a and 85b are given labels that represent the latest processed grooves 92 processed by the cutting blades 71 on the first spindle side and the second spindle side, respectively, and the operator is caused to recognize which cutting blade 71 processed the latest processed groove 92. This can cause the reference line of the imaging unit 73 to correspond with the central position of the latest processed groove 92 and prevent an operation mistake such as execution of hairline adjustment on a processed groove other than the latest processed groove 92.

Figure 4:
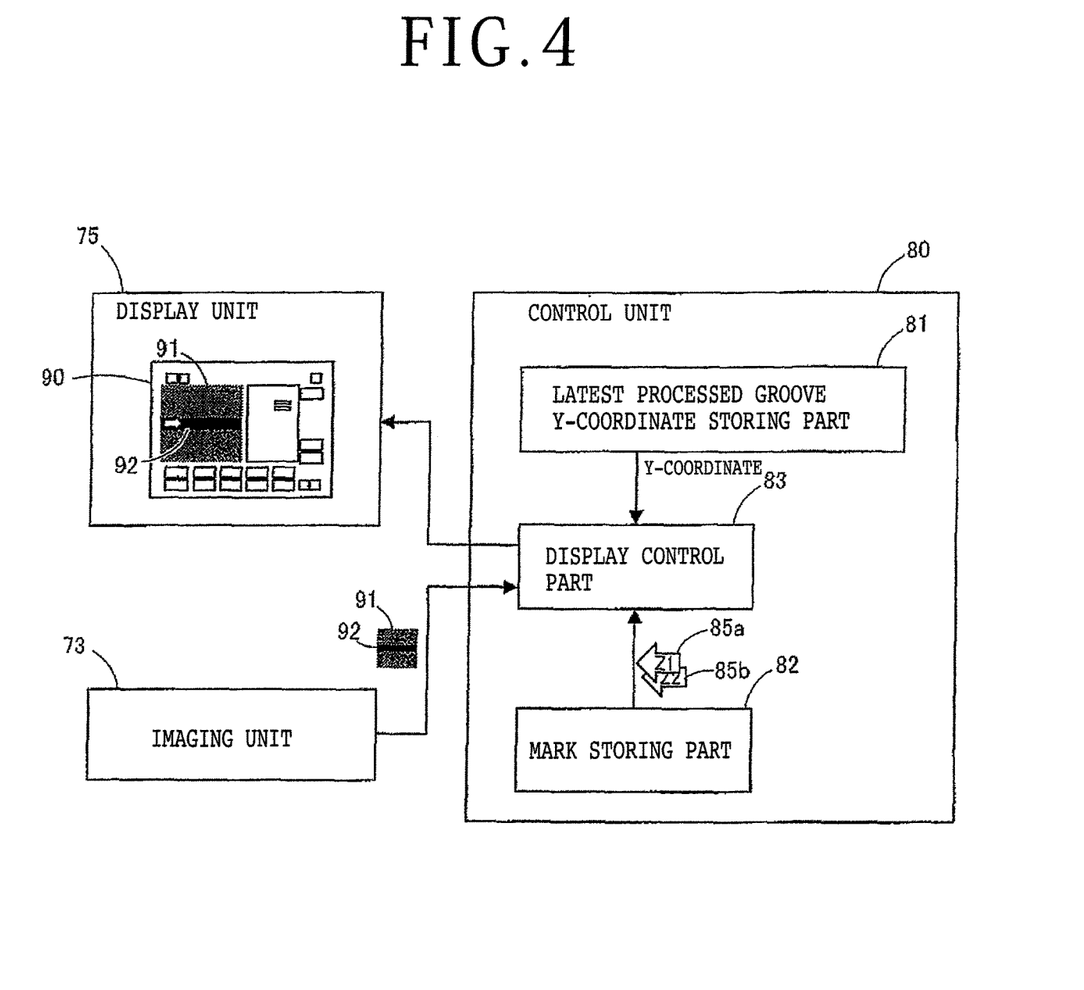
FIG. 4 is a block diagram depicting display control of a display unit in the present embodiment.

Display control of the display screen will be described below with reference to FIG. 4. FIG. 4 is a block diagram depicting the display control of the display unit in the present embodiment.

As depicted in FIG. 4, the display unit 75 is a touch panel of the capacitive system, for example, and the stop screen 90 is displayed thereon at the time of suspension of processing. On the stop screen 90, the captured image 91 obtained by imaging, by the imaging unit 73, the processed groove 92 formed through processing the workpiece W by the processing units 70 is displayed. The control unit 80 that executes the display control of the display screen is connected to the display unit 75 and the imaging unit 73. The control unit 80 is equipped with a latest processed groove Y-coordinate storing part 81 that stores the Y-coordinate of the latest processed groove 92, a mark storing part 82 that stores the marks 85a and 85b that indicate the latest processed groove 92, and a display control part 83 that displays the mark 85a or 85b on the captured image 91 in a superimposing manner based on the Y-coordinate.

In the latest processed groove Y-coordinate storing part 81, the Y-coordinate that is the central position of the latest processed groove 92 formed by immediately-previous processing operation is stored. In this case, indexing feed of the cutting blade 71 (see FIG. 6A) is executed in the Y-axis direction and the position thereof is adjusted to a street of the workpiece W. Then, the workpiece W is processed along the street by the cutting blade 71. When the processing by the cutting blade 71 is suspended, the Y-coordinate of the widthwise center of the cutting blade 71 at the time of suspension of the processing is stored in the latest processed groove Y-coordinate storing part 81 as the Y-coordinate of the latest processed groove 92. In the latest processed groove Y-coordinate storing part 81, the Y-coordinate of the latest processed groove 92 is updated every time processing of the workpiece W is suspended.

In the mark storing part 82, the marks 85a and 85b formed with arrow images are stored. The mark 85a is given a label Z1 that represents the latest processed groove 92 processed by the cutting blade 71 on the first spindle side and the mark 85b is given a label Z2 that represents the latest processed groove 92 processed by the cutting blade 71 on the second spindle side. Due to the labels Z1 and Z2 given to the marks 85a and 85b, it is possible to immediately visually discriminate which of the cutting blade 71 on the first spindle side and the cutting blade 71 on the second spindle side processed the latest processed groove 92 in the captured image 91.

In the display control part 83, the mark 85a or the mark 85b is displayed in a superimposed manner on the captured image 91 displayed by the display unit 75. In this case, the present imaging position is acquired from the imaging unit 73 and the Y-coordinate of the latest processed groove 92 is acquired from the latest processed groove Y-coordinate storing part 81. Furthermore, the mark 85a or the mark 85b is selectively acquired from the mark storing part 82 according to whether the imaging unit 73 exists on the first spindle side or on the second spindle side. Then, the mark 85a or the mark 85b is disposed on the captured image based on the Y-coordinate of the latest processed groove 92 and the direction indicated by the mark 85a or the mark 85b is switched according to the present imaging position of the imaging unit 73 and the Y-coordinate of the latest processed groove 92.

Figure 5B:
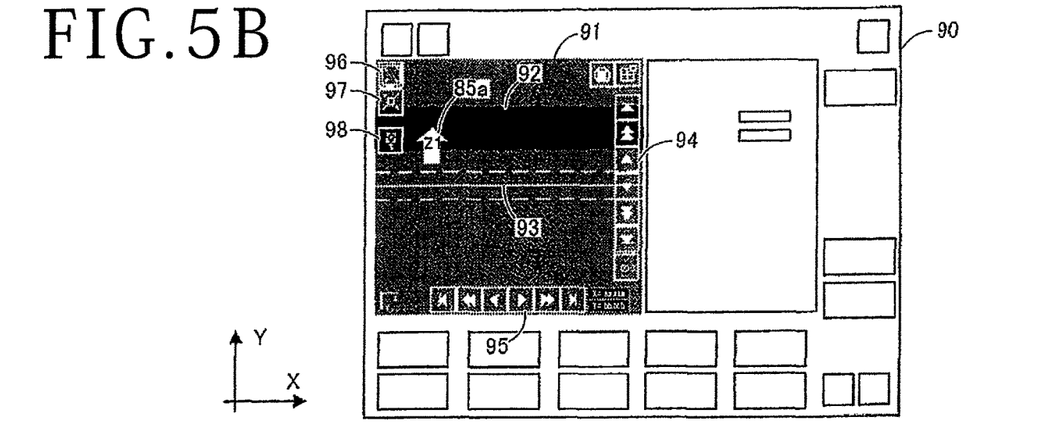
Figure 6A:
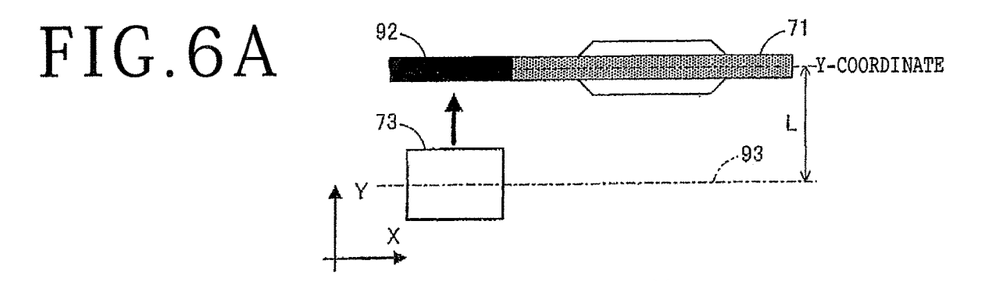
FIG. 6A, FIG. 6B, FIG. 6C, and FIG. 6D are diagrams depicting one example of the display control in the present embodiment.
Figure 6B:
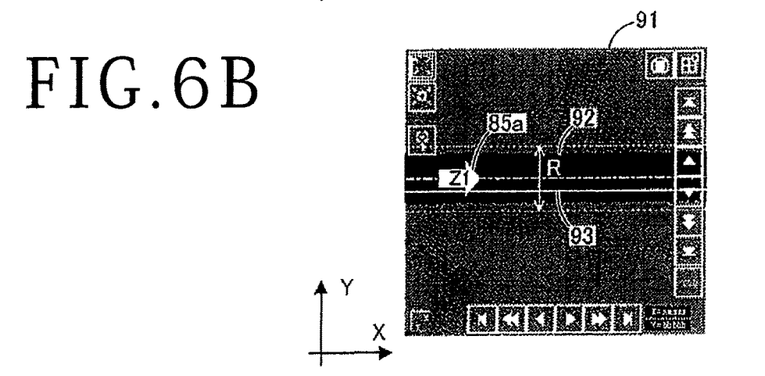

For example, if the present imaging position of the imaging unit 73 exists in a predetermined range centered at the Y-coordinate of the latest processed groove 92, the mark 85a or 85b in the horizontal direction is displayed on the captured image 91 and the latest processed groove 92 is indicated by the mark 85a or 85b from the X-axis direction (see FIG. 6B). Furthermore, if the present imaging position of the imaging unit 73 exists outside the predetermined range centered at the latest processed groove 92, the mark 85a or 85b in the vertical direction is displayed on the captured image 91 and the latest processed groove 92 is indicated from the Y-axis direction by the mark 85a or 85b (see FIG. 5B). By the mark 85a or 85b, the position of the latest processed groove 92 is identified on the basis of the present imaging position.

In this manner, the mark 85a or the mark 85b is displayed on the captured image in such a manner as to indicate the latest processed groove 92 on the display unit 75. The respective parts of the control unit 80 are formed of processor, memory, and so forth that execute various kinds of processing. The memory is formed of one or plural storage media such as read only memory (ROM) and random access memory (RAM) according to the use purpose. In the memory, a program for drive control of the respective parts of the apparatus and a program for display control are stored, for example. Furthermore, the control unit 80 may be disposed exclusively for the display unit 75 separately from control of the whole of the cutting apparatus 1.

Figure 5A:
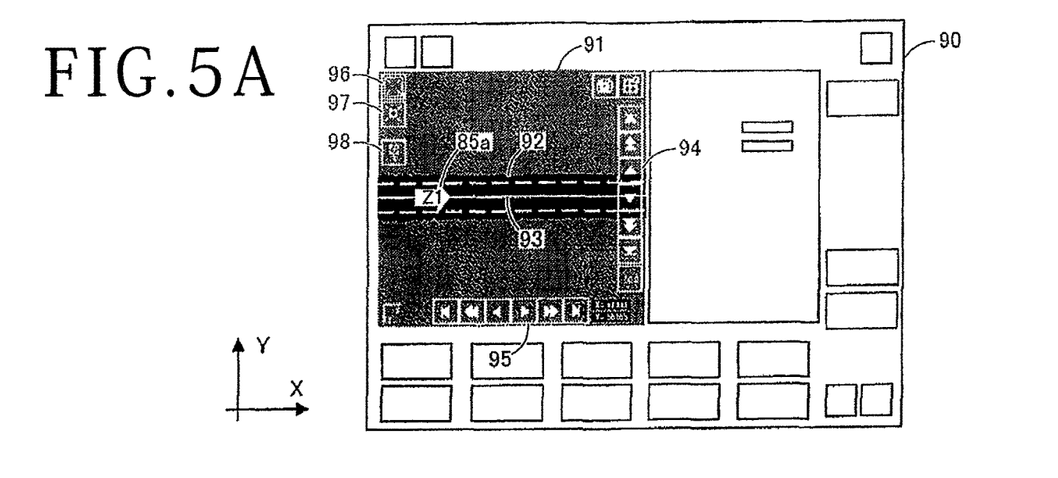
FIG. 5A, FIG. 5B, and FIG. 5C are diagrams depicting one example of a stop screen in the present embodiment.
Figure 5C:
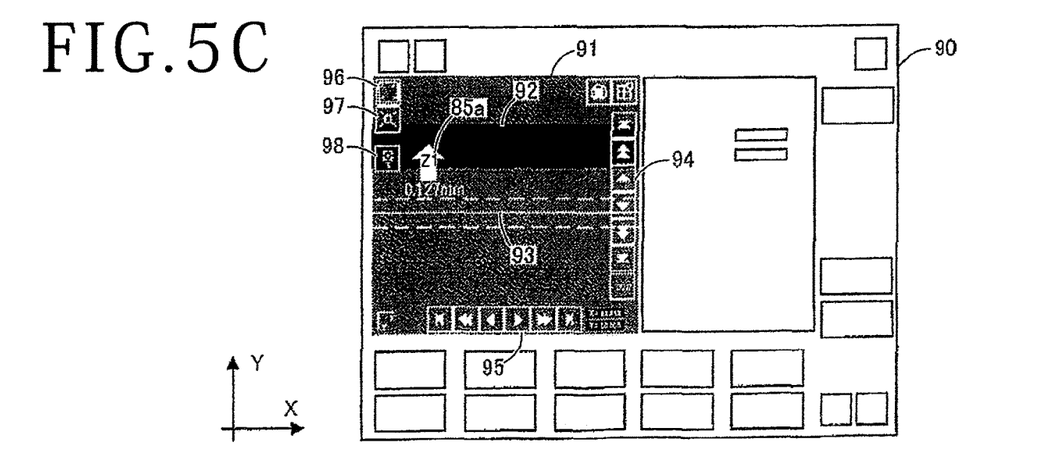

With reference to FIG. 5A, FIG. 5B, and FIG. 5C, one example of the stop screen that indicates the latest processed groove will be described. FIG. 5A, FIG. 5B, and FIG. 5C are diagrams depicting the one example of the stop screen in the present embodiment. In FIG. 5A, FIG. 5B, and FIG. 5C, the description will be made by using numerals in FIG. 4 as appropriate. Although one example of the stop screen of the first spindle side will be described with FIG. 5A, FIG. 5B, and FIG. 5C, the same stop screen is used also for the second spindle side.

As depicted in FIG. 5A, the captured image 91 is displayed on the stop screen 90 of the cutting apparatus 1 (see FIG. 1). On this captured image 91, the reference line 93 of the imaging unit 73 is displayed and the mark 85a that indicates the latest processed groove 92 is displayed. When the Y-coordinate of the reference line 93 of the imaging unit 73 corresponds with the Y-coordinate of the latest processed groove 92, the mark 85a is superimposed on the latest processed groove 92 in the state of being oriented in the X-axis direction. By visually recognizing the mark 85a, the operator can recognize that the processed groove 92 displayed in the captured image 91 is the latest. Although the Y-coordinates of the processed groove 92 and the reference line 93 correspond with each other here, hairline adjustment is executed if a deviation exits between these Y-coordinates.

The mark 85a is formed of an arrow image and the label Z1 that represents the first spindle side is given to the arrow image. This can cause the operator to recognize that the latest processed groove 92 indicated by the mark 85a is the latest processed groove 92 processed by the cutting blade 71 on the first spindle side. Not only the mark 85a of the processed groove 92 processed by the cutting blade 71 on the first spindle side but also the mark 85b (see FIG. 4) of the processed groove 92 processed by the cutting blade 71 on the second spindle side may be displayed in the captured image 91. This can cause the operator to simultaneously recognize the latest processed groove 92 of the first spindle side and the latest processed groove 92 of the second spindle side in one stop screen 90.

Furthermore, in the captured image 91, various operation buttons are displayed besides the reference line 93 of the imaging unit 73 and the mark 85a. For example, movement buttons 94 to move the imaging unit 73 (reference line 93) in the Y-axis direction by manual operation are displayed along the right side of the captured image 91, and movement buttons 95 to move the imaging unit 73 (reference line 93) in the X-axis direction by manual operation are displayed along the lower side of the captured image 91. Moreover, along the left side of the captured image 91, a switching button 96 for macro-display, a switching button 97 for micro display, a position adjustment button 98 to automatically cause the Y-coordinate of the reference line 93 of the imaging unit 73 to correspond with the Y-coordinate of the latest processed groove 92 are displayed from the upper side.

As depicted in FIG. 5B, when the imaging unit 73 is moved by using the movement button 94, the orientation of the mark 85a is switched according to the distance between the Y-coordinate of the reference line 93 and the Y-coordinate of the processed groove 92. For example, when the imaging unit 73 is moved in the Y-axis direction and the reference line 93 of the imaging unit 73 gets out of the predetermined range on the basis of the processed groove 92, the orientation of the mark 85a is switched from the X-axis direction to the Y-axis direction and the latest processed groove 92 is indicated by the mark 85a from the Y-axis direction. Due to this, even when the imaging unit 73 is moved from the latest processed groove 92 and a quality check or the like of another processed groove 92 is executed, it is possible to cause the operator to recognize the position of the latest processed groove 92.

As depicted in FIG. 5C, the distance from the Y-coordinate of the reference line 93 (present imaging position) to the Y-coordinate of the latest processed groove 92 may be displayed in the captured image 91. This can cause the operator to recognize the offset amount between the latest processed groove 92 and the reference line 93 in addition to the position of the latest processed groove 92. Furthermore, the distance from the Y-coordinate of the latest processed groove 92 to the Y-coordinate of the reference line 93 of the imaging unit 73 may be displayed as the number of lines of processed grooves. Although the configuration in which the mark 85a is displayed in the captured image 91 in micro-display is employed in FIG. 5A, FIG. 5B, and FIG. 5C, the mark 85a is similarly displayed in the captured image 91 also in macro-display.

With reference to FIG. 6A, FIG. 6B, FIG. 6C, and FIG. 6D, one example of display control by the display control part will be described. FIG. 6A, FIG. 6B, FIG. 6C, and FIG. 6D are diagrams depicting the one example of the display control in the present embodiment. In FIG. 6A, FIG. 6B, FIG. 6C, and FIG. 6D, the description will be made by using numerals in FIG. 4 as appropriate. Although display control of the processed groove of the first spindle side will be described with FIG. 6A, FIG. 6B, FIG. 6C, and FIG. 6D, display control is executed by the same method also for the second spindle side.

As depicted in FIG. 6A, when processing by the cutting apparatus 1 (see FIG. 1) is suspended, the imaging unit 73 is positioned to the latest processed groove 92 based on a predetermined distance L from the reference line 93 of the imaging unit 73 to the widthwise center of the cutting blade 71 and the cutting position (Y-coordinate) of the cutting blade 71. Furthermore, by the display control part 83, the Y-coordinate of the latest processed groove 92 is acquired from the latest processed groove Y-coordinate storing part 81 and the mark 85a is acquired from the mark storing part 82. Then, the captured image 91 including the latest processed groove 92 is taken by the imaging unit 73 and the reference line 93 of the imaging unit 73 is displayed in the captured image 91. In addition, the mark 85a that indicates the latest processed groove 92 is displayed (see FIG. 6B and FIG. 6C).

As depicted in FIG. 6B, if the Y-coordinate of the reference line 93 of the imaging unit 73 falls within a predetermined range R centered at the Y-coordinate of the latest processed groove 92, the mark 85a is displayed in the horizontally-oriented state on the latest processed groove 92 in a superimposed manner based on the Y-coordinate of the latest processed groove 92. For example, the direction of the mark 85a is oriented in the X-axis direction in the state in which the tip of the arrow of the mark 85a is positioned to the Y-coordinate of the latest processed groove 92. Due to this, it is recognized by the operator that the processed groove 92 indicated by the tip of the arrow of the mark 85a is the latest. Furthermore, due to the label Z1 of the mark 85a, it is recognized by the operator that this processed groove 92 is the latest processed groove 92 processed by the cutting blade 71 on the first spindle side.

Figure 6C:
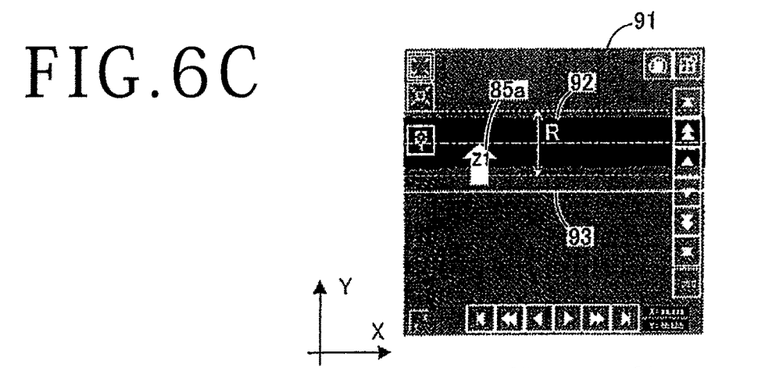

As depicted in FIG. 6C, when the imaging unit 73 is moved and the Y-coordinate of the reference line 93 of the imaging unit 73 gets out of the predetermined range R centered at the Y-coordinate of the latest processed groove 92, the orientation of the mark 85a is switched from the horizontal direction to the vertical direction. For example, the direction of the mark 85a is oriented in the Y-axis direction in the state in which the tip of the arrow of the mark 85a is positioned to the Y-coordinate of the latest processed groove 92. As above, the direction indicated by the mark 85a is switched by the display control part 83 according to the distance from the Y-coordinate of the latest processed groove 92 to the Y-coordinate of the reference line 93 (present imaging position). The predetermined range R is a range set by the operator for the cutting apparatus 1 in advance.

Figure 6D:
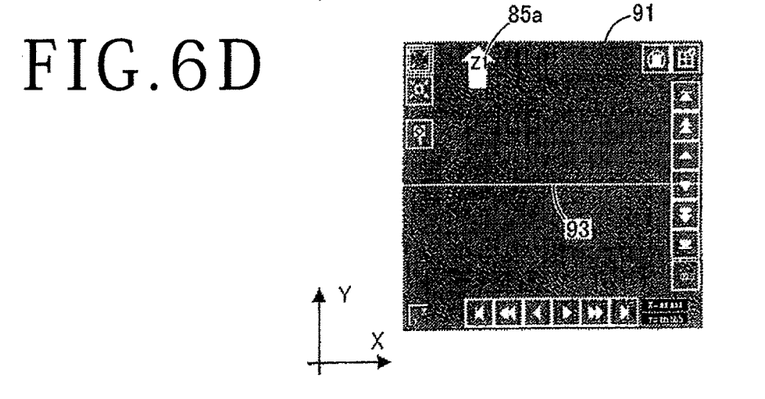

Although the tip of the arrow of the mark 85a is positioned to the Y-coordinate of the latest processed groove 92 in FIG. 6B and FIG. 6C, the present invention is not limited to this configuration. The tip of the arrow of the mark 85a may deviate from the Y-coordinate of the latest processed groove 92 and it suffices for the mark 85a to be displayed on the captured image 91 in a superimposed manner at least in such a manner as to indicate the latest processed groove 92. For example, as depicted in FIG. 6D, if the latest processed groove 92 is not included in the captured image 91, the tip of the arrow of the mark 85a is not positioned to the Y-coordinate of the latest processed groove 92 and the mark 85a indicates only the direction in which the latest processed groove 92 exists with respect to the reference line 93 of the imaging unit 73.

As described above, according to the cutting apparatus 1 of the present embodiment, the mark 85a or 85b that indicates the latest processed groove 92 is displayed on the captured image 91 in a superimposed manner by the display unit 75. Because the latest processed groove 92 is indicated by the mark 85a or 85b on the captured image 91, it is possible to cause the operator to always recognize the position of the latest processed groove 92. Furthermore, the sight of the latest processed groove 92 is not lost even when the imaging unit 73 is moved and a place different from the latest processed groove 92 is checked.

In the present embodiment, a touch panel in which the display function and the operation function are integrated is exemplified as the display unit. However, the present invention is not limited to this configuration. The display unit may be formed of a display exclusively for displaying regarding which the operation function is entrusted to another input device.

Furthermore, in the present embodiment, the configuration that moves the chuck table in the processing feed direction relative to the processing units is employed as the processing feed mechanism. However, the present invention is not limited to this configuration. It suffices for the processing feed mechanism to be a configuration that relatively moves the chuck table and the processing units in the processing feed direction, and a configuration that moves the processing units in the processing feed direction relative to the chuck table may be employed.

Moreover, in the present embodiment, the configuration that moves the processing units in the indexing feed direction relative to the chuck table is employed as the indexing feed mechanism. However, the present invention is not limited to this configuration. It suffices for the indexing feed mechanism to be a configuration that relatively moves the chuck table and the processing units in the indexing feed direction, and a configuration that moves the chuck table in the indexing feed direction relative to the processing units may be employed.

In addition, although the mark is formed of the arrow image in the present embodiment, the present invention is not limited to this configuration. It suffices for the mark to have a shape that indicates the latest processed groove, and the mark may be formed of a finger mark, for example.

Furthermore, in the present embodiment, the configuration in which the orientation of the mark is switched between the Y-axis direction and the X-axis direction is employed. However, the present invention is not limited to this configuration. It suffices for the orientation of the mark to be an orientation that indicates the latest processed groove, and the mark may be oriented in an oblique direction, for example.

Moreover, although the configuration in which the label is given to the mark is employed in the present embodiment, the present invention is not limited to this configuration. If there is no need to discriminate the first spindle side and the second spindle side as in a single-spindle processing apparatus, the label does not need to be given to the mark.

In addition, although the description is made through exemplification of a dual-spindle cutting apparatus as a processing apparatus in the present embodiment, the present invention is not limited to this configuration. The present invention can be applied to other processing apparatuses that form processed grooves in a workpiece. For example, other processing apparatuses such as a single-spindle cutting apparatus, a laser processing apparatus, and a cluster apparatus obtained by combining them may be employed.

Furthermore, various works such as semiconductor substrate, inorganic material substrate, and package board may be used as the workpiece. As the semiconductor substrate, various substrates made of silicon, gallium arsenide, gallium nitride, silicon carbide, and so forth may be used. As the inorganic material substrate, various substrates made of sapphire, ceramic, glass, and so forth may be used. Devices may be formed on the semiconductor substrate and the inorganic material substrate or devices do not have to be formed thereon. As the package board, various boards for chip size package (CSP), wafer level chip size package (WLCSP), system in package (SIP), and fan out wafer level package (FOWLP) may be used. A shield as an electromagnetic interference (EMI) countermeasure may be formed on the package board. Moreover, as the work, lithium tantalate, lithium niobate, green ceramic, and piezoelectric material after device formation or before device formation may be used.

Furthermore, although the present embodiment and modification examples are described, what are obtained by combining the above-described embodiment and modification examples totally or partly may be employed as other embodiments of the present invention.

Moreover, embodiments of the present invention and modification examples are not limited to the above-described embodiment and may be variously changed, replaced, and modified in such a range as not to depart from the gist of technical ideas of the present invention. In addition, if a technical idea of the present invention can be implemented in another way due to advancement in the technique or another technique that is derivative, the technical idea may be implemented by using the method. Therefore, the scope of claims covers all embodiments that can be included in the range of technical ideas of the present invention.

As described above, the present invention has an effect that always the latest processed groove can be recognized without losing the sight of the latest processed groove and is particularly effective for a processing apparatus that processes a workpiece by a cutting blade.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing apparatus comprising:
    a chuck table that holds a workpiece;
    a processing unit that forms a plurality of processed grooves in the workpiece held by the chuck table including a latest processed groove;
    a processing feed mechanism that relatively moves the chuck table and the processing unit in a processing feed direction that is an X-axis direction;
    an indexing feed mechanism that relatively moves the chuck table and the processing unit in an indexing feed direction that is a Y-axis direction perpendicular to the processing feed direction;
    an imaging unit that images the workpiece held by the chuck table including an area containing the latest processed groove;
    a display unit that displays a captured image of the latest processed groove obtained by imaging, by the imaging unit, the latest processed groove formed through processing the workpiece by the processing unit; and
    a control unit comprising a processor,
    wherein the control unit includes
        a memory that stores a Y-coordinate of the latest processed groove, and
        wherein the processor causes a mark that identifies the location of the latest processed groove based on the Y-coordinate to be displayed in a superimposed manner on the captured image displayed on the display unit.

2. The processing apparatus according to claim 1, wherein the processor switches a direction indicated by the mark according to a present imaging position of the imaging unit relative to the Y-coordinate of the latest processed groove.

3. The processing apparatus according to claim 2, wherein the display unit displays a reference line associated with the imaging unit, wherein the mark is elongated along a longitudinal direction, and wherein when the reference line of the imaging unit is within a predetermined range of the displayed processed groove, the longitudinal direction of the mark is displayed in the X-axis direction.

4. The processing apparatus according to claim 2, wherein the display unit displays a reference line associated with the imaging unit, wherein the mark is elongated along a longitudinal direction, and wherein when the reference line of the imaging unit is outside a predetermined range of the displayed processed groove, the longitudinal direction of the mark is displayed in the Y-axis direction.

5. The processing apparatus according to claim 1, wherein the display unit displays a captured image of a processed groove obtained by imaging, by the imaging unit, the processed groove formed through processing the workpiece by the processing unit on a stop screen when the formation of the processed groove by the processing unit has been suspended.

6. The processing apparatus according to claim 5, further comprising movement buttons to cause the location of the imaging unit to be moved relative to the workpiece.

7. The processing apparatus according to claim 6, wherein the display unit displays a reference line associated with the imaging unit, wherein the mark is elongated along a longitudinal direction, and wherein when the reference line of the imaging unit is within a predetermined range of the displayed processed groove, the longitudinal direction of the mark is displayed in the X-axis direction.

8. The processing apparatus according to claim 6, wherein the display unit displays a reference line associated with the imaging unit, wherein the mark is elongated along a longitudinal direction, and wherein when the reference line of the imaging unit is outside a predetermined range of the displayed processed groove, the longitudinal direction of the mark is displayed in the Y-axis direction.

9. The processing apparatus according to claim 8, wherein the mark has the shape of an arrow having an arrowhead, and wherein the arrowhead points toward the latest processed groove.

10. A method of processing a workpiece using a processing apparatus comprising a chuck table that holds a workpiece; a processing unit that forms a processed groove in the workpiece held by the chuck table; a processing feed mechanism that relatively moves the chuck table and the processing unit in a processing feed direction that is an X-axis direction; an indexing feed mechanism that relatively moves the chuck table and the processing unit in an indexing feed direction that is a Y-axis direction perpendicular to the processing feed direction; an imaging unit that images the workpiece held by the chuck table; a display unit; a processor; and a memory that stores a Y-coordinate of a latest processed groove, the method comprising:
    displaying on the display unit a captured image of the workpiece including an area of the workpiece containing a portion of a latest processed groove obtained by imaging, by the imaging unit, an area of the workpiece containing the latest processed groove formed through processing the workpiece by the processing unit; and
    displaying in a superimposed manner on the display unit a mark that indicates the location of the latest processed groove displayed on the display unit.

11. The method according to claim 10, further comprising
displaying on the display unit a reference line associated with the imaging unit, wherein the mark is elongated along a longitudinal direction, and when the reference line of the imaging unit is within a predetermined range of the displayed latest processed groove, displaying the mark such that the longitudinal direction of the mark is displayed in the X-axis direction.

12. The method according to claim 10, further comprising
displaying on the display unit a reference line associated with the imaging unit, wherein the mark is elongated along a longitudinal direction, and when the reference line of the imaging unit is outside a predetermined range of the displayed latest processed groove, displaying the mark such that the longitudinal direction of the mark is displayed in the Y-axis direction.

13. The method according to claim 10, wherein the act of displaying on the display unit a captured image of the workpiece occurs after the formation of the processed groove by the processing unit has been suspended.

14. The method according to claim 10, further comprising moving the location of the imaging unit relative to the workpiece and thereby changing the area of the workpiece which is displayed on the display unit.

15. The method according to claim 14, further comprising
displaying on the display unit a reference line associated with the imaging unit, wherein the mark is elongated along a longitudinal direction, and when the reference line of the imaging unit is within a predetermined range of the displayed latest processed groove, displaying the mark such that the longitudinal direction of the mark is displayed in the X-axis direction.

16. The method according to claim 15, further comprising
when the reference line of the imaging unit is outside the predetermined range of the displayed latest processed groove, displaying the mark such that the longitudinal direction of the mark is displayed in the Y-axis direction.

17. The method according to claim 16, further comprising switching the orientation of the mark from having the longitudinal direction of the mark being displayed in the X-axis direction to having longitudinal direction of the mark being displayed in the Y-axis direction when the location of the imaging unit is moved such that the reference line associated with the imaging unit moves from being within the predetermined range to be outside the predetermined range.

18. The method according to claim 17, wherein the mark has the shape of an arrow having an arrowhead and wherein the arrowhead points toward the latest processed groove when the reference line of the imaging unit is outside the predetermined range.

19. The method according to claim 14, further comprising
displaying on the display unit a reference line associated with the imaging unit, wherein the mark is elongated along a longitudinal direction, and when the reference line of the imaging unit is outside a predetermined range of the displayed latest processed groove, displaying the mark such that the longitudinal direction of the mark is displayed in the Y-axis direction.

20. The method according to claim 10, wherein the mark has the shape of an arrow having an arrowhead and wherein the arrowhead points toward the latest processed groove.

* * * * *